Oct. 20, 1970 S. G. LIPSETT 3,535,150
PROCESS FOR IMPROVING THE FREENESS OF ASBESTOS
Filed April 3, 1967 4 Sheets-Sheet 1
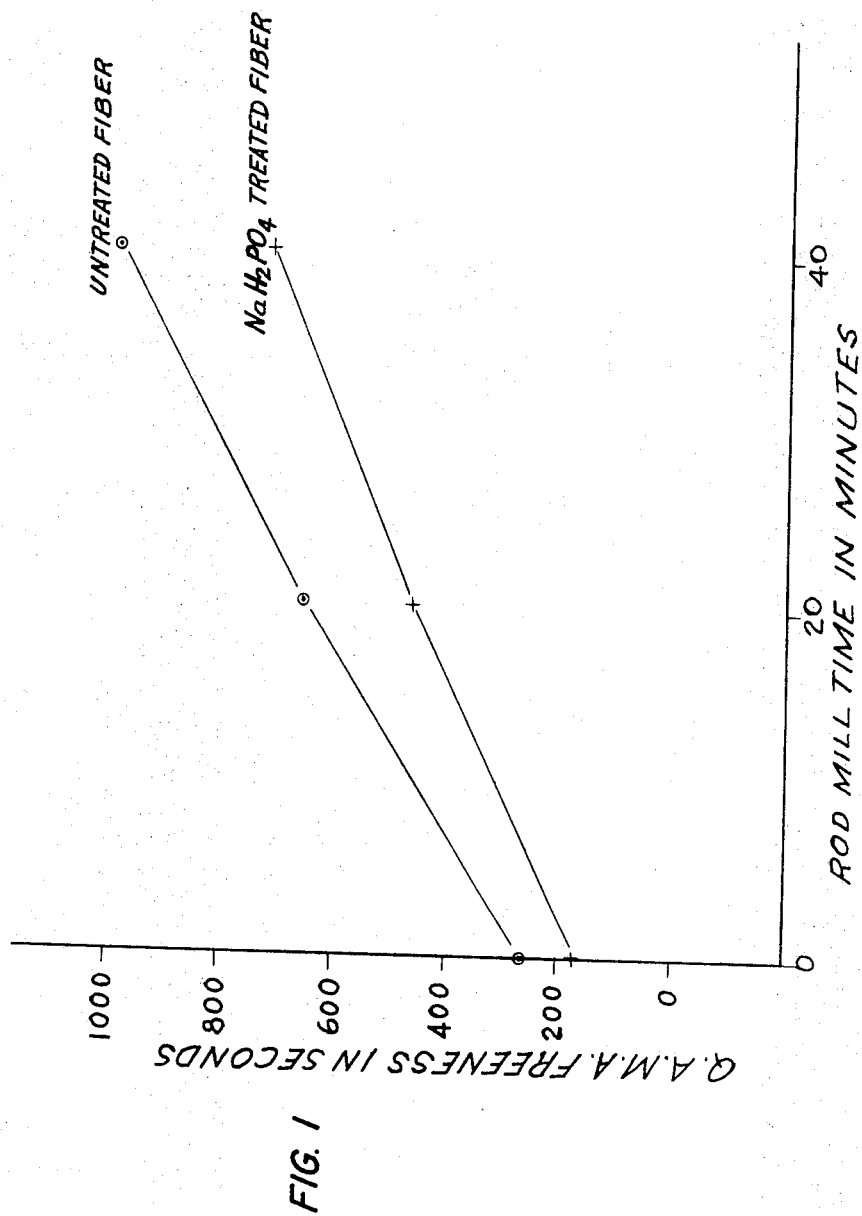
FIG. 1
INVENTOR
Solomon George LIPSETT
ATTORNEY

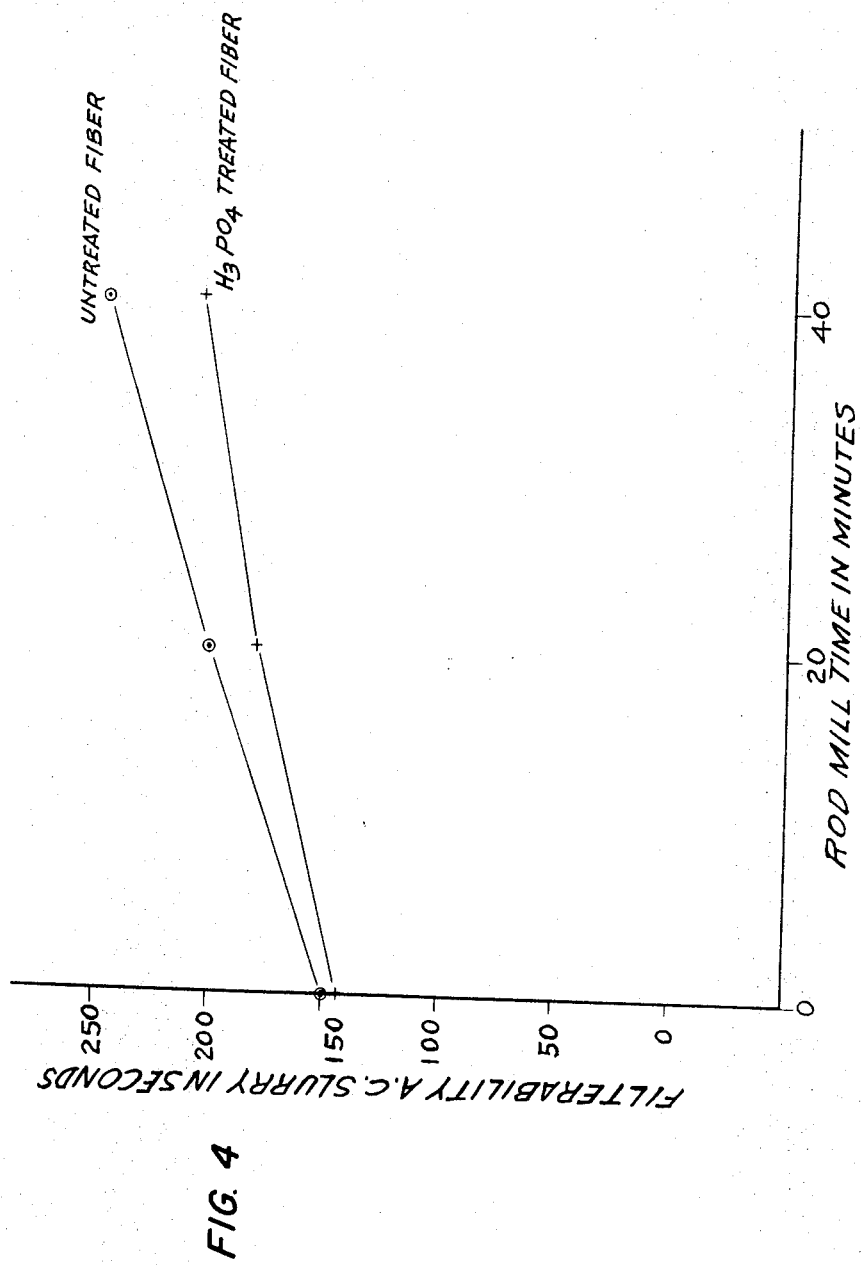
FIG. 4
INVENTOR
Solomon George LIPSETT
ATTORNEY

Oct. 20, 1970  S. G. LIPSETT  3,535,150
PROCESS FOR IMPROVING THE FREENESS OF ASBESTOS
Filed April 3, 1967  4 Sheets-Sheet 2

INVENTOR
Solomon George LIPSETT

ATTORNEY

Oct. 20, 1970  S. G. LIPSETT  3,535,150
PROCESS FOR IMPROVING THE FREENESS OF ASBESTOS
Filed April 3, 1967  4 Sheets-Sheet 3
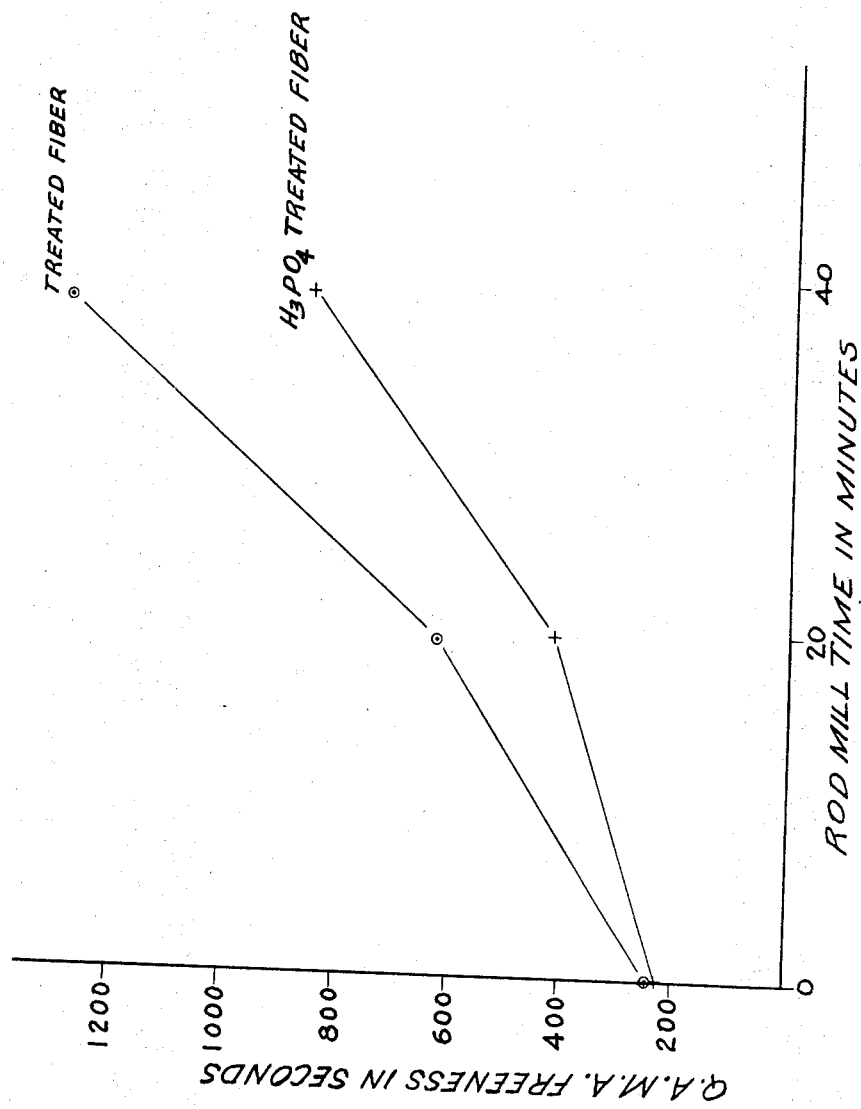
FIG. 3
INVENTOR
Solomon George LIPSETT
ATTORNEY

United States Patent Office 3,535,150
Patented Oct. 20, 1970

3,535,150
PROCESS FOR IMPROVING THE FREENESS OF ASBESTOS
Solomon George Lipsett, Montreal, Quebec, Canada, assignor to Asbestos Corporation Limited, Thetford Mines, Quebec, Canada
Filed Apr. 3, 1967, Ser. No. 627,764
Claims priority, application Canada, Apr. 5, 1966, 15,158
Int. Cl. B32b 19/08
U.S. Cl. 117—100    7 Claims

ABSTRACT OF THE DISCLOSURE

Asbestos fibers are treated, as described with an aqueous solution of a phosphate or polyphosphate or a corresponding acid and the thus treated fibers are dried. The treatment greatly increases the freeness of the fibers and is a valuable help in filtering compositions containing asbestos.

FIELD OF THE INVENTION

Figure 2:
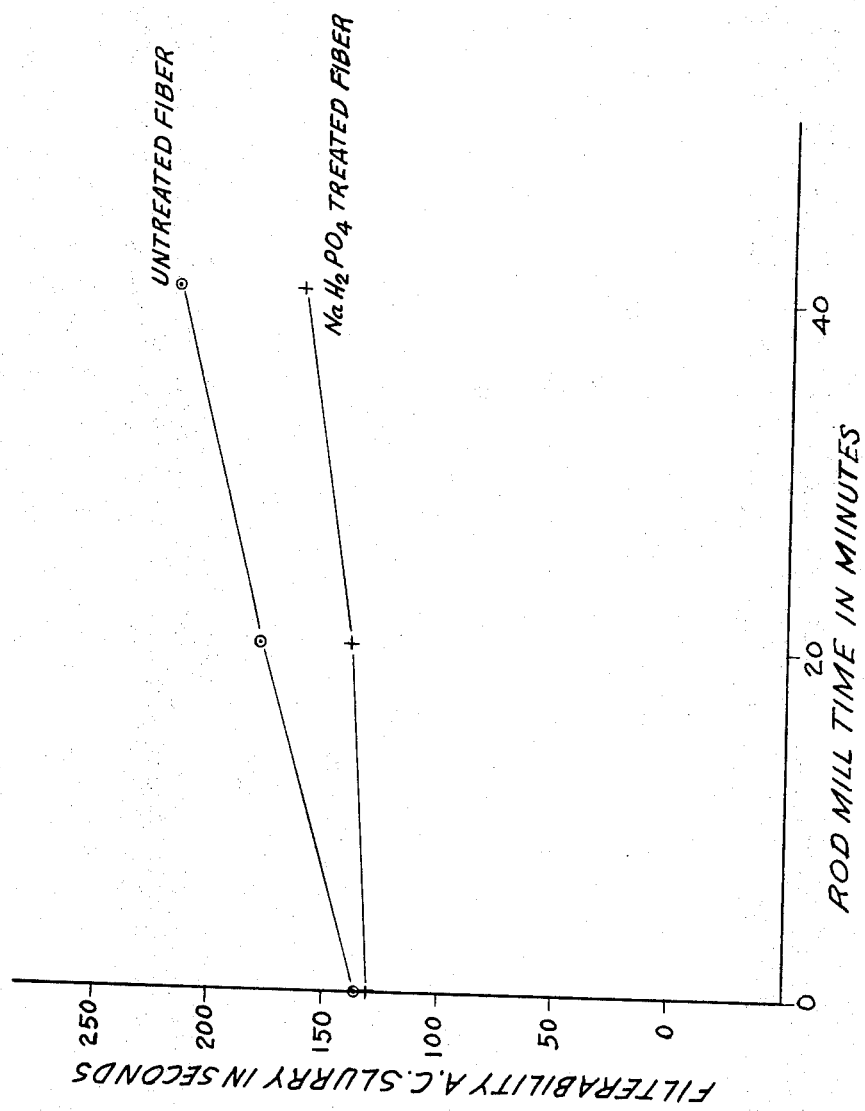

This invention relates to asbestos fiber and to products obtained therefrom. This invention also relates to a process for improving the freeness or filterability of asbestos.

DESCRIPTION OF THE PRIOR ART

Asbestos is now used in a variety of products including asbestos-cement materials for several uses, e.g. as construction materials. It is necessary, in these conversion processes, to add water to the mixture of asbestos, cement and other materials in order to hydrate the cement constituent and cause it to set. In the process generally referred to as the "wet process," excess water is used, for several reasons: it enables sheets to be made on cylinder machines or on other machines similar to those used in the paper industry; intimate mixing of the components is secured; the mixture may be beaten before filtration to break open clusters of asbestos fibers; complete hydration is rendered certain. The excess water must then be removed from the mixture.

Freeness varies to a great extent between different grades of asbestos and between the asbestos obtained from different deposits.

Several processes have been proposed for improving the freeness of asbestos fiber, including heat treatment of the fiber and treatment with sodium or potassium silicate. In the former, the degree and time of heating must be very carefully controlled since overheating seriously affects the properties of the fiber. Even with such careful control, the tensile strength of the fiber is still reduced. In the latter treatment, alkali metal silicates, usually sodium silicate, are used. Such silicates are highly alkaline materials and their application to asbestos fibers coats then with a highly alkaline film. There follows an accelerating effect on the setting of cement and, consequently, a deleterious effect on the curing of the asbestos-cement material. The disadvantages inherent in these processes handicap their utility.

SUMMARY OF THE INVENTION

It is an object of the present invention to provide a process for improving the freeness of asbestos fibers.

It is also an object of the present invention to provide asbestos fibers having improved freeness.

Other objects and advantages will be apparent from the description to follow.

In the accompanying drawings:

FIGS. 1–4 represent graphs of comparative data showing the superior effects obtained by the process of the present invention upon the freeness of asbestos fibers.

In accordance with the present invention, a process for improving the freeness of asbestos fibers is provided, which comprises treating said fibers with an aqueous solution of a phosphate or polyphosphate or a corresponding acid to deposit on the fibers an amount of about 5% by weight or less of said salt or said acid, and drying the thus treated fibers.

In accordance with the present invention, there is also provided asbestos fibers treated in accordance with the present process which have improved freeness.

The amount of salt or acid deposited on the fibers is preferably from 0.4 to 2.0% by weight of the fibers. A marked improvement is shown by using as little as 0.2%. It is not preferred to use amounts higher than 2.5% as it dilutes unnecessarily the amount of fiber in the resultant product. The disadvantages introduced in using amount higher than 5% counteract any advantages derived therefrom.

Included within the scope of the invention are metallic phosphates or phosphates in which the cation is a complex radical e.g. ammonium or the correponding polyphosphates.

Phosphates of varying degrees of acidity are included e.g. hemi-, mono-, di-, and tribasic or even phosphates having a fractional acidity i.e. wherein the degree of acidity does not correspond stoichiometrically to the hemi-, mono-, di- or tribasic phosphate.

In the case of metals or positive radicals such as sodium or potassium whose phosphates are soluble in water, any of these phosphates may be used. For metals such as aluminum, whose tribasic or dibasic phosphates are insoluble in water, the more acid phosphates such as the monobasic, may be used when soluble in water or when dissolved or dispersed in water by the aid of a small amount of acid; solutions of such acid phosphates may also be obtained by dissolving the more basic phosphate in an aqueous solution of an acid, preferably phosphoric acid.

Examples of satisfactory phosphates and polyphosphates that can be used in carrying out the present invention are: $Na_3PO_4$, $Na_2HPO_4$, $NaH_2PO_4$, sodium hexametaphosphate, tetrasodium pyrophosphate, aluminum phosphate, sodium tripolyphosphate and phosphoric acid. Preferred are monobasic sodium phosphate ($NaH_2PO_4$) and phosphoric acid.

Liquid phosphoric acid and other liquid acids can be used as such, if more convenient.

The reagent used becomes bonded at least in part to the fiber. The bond appears to be chemical, although the invention is not restricted to any theoretical consideration.

DESCRIPTION OF THE PREFERRED EMBODIMENTS

The following examples will further illustrate the present invention.

For each of the following Examples 1–4, 6 and 8, the individual tests were carried out as follows:

Ten grams of the specified asbestos grade were used. The indicated weight of a phosphate dissolved in 30 ml. of water was added to the asbestos and mixed in well. The fiber so treated was dried at the indicated temperature. Another 10-gram portion of the same grade of asbestos was used as control. It was treated with 30 ml. distilled water, without addition of phosphate, and dried at the same temperature as the phosphate-treated sample. The time of filtration of the samples was measured by the Freeness Test. For this test each sample was treated as follows:

"Prepared water" was made by adding 2 grams of calcium hydroxide and 3 grams of hydrated calcium sulphate to 1 liter of distilled water. The mixture was allowed to stand for 24 hours with frequent shaking and any undissolved residue then allowed to settle. The supernatant liquid then constituted "prepared water."

A 10-gram sample of the asbestos to be treated was added to 500 ml. of "prepared water" and the mixture beaten for one minute in a 1 liter beating apparatus, equipped with a paddle. The paddle was 40 mm. wide and 100 mm. high and was rotated at 1500 r.p.m. Immediately after beating, the mixture was poured into the freeness tester and the freeness determined by the procedure "Freeness Test for Asbestos" described in "Testing Procedures for Chrysotile Asbestos Fibre," 1966 edition, prepared jointly by the Asbestos Textile Institute, the Mineral Fiber Products Bureau and the Quebec Asbestos Mining Association.

If A is the time of filtration, in seconds, of the control sample, as determined by the Freeness Test and if B is the time of filtration, in seconds, of the asbestos sample treated with phosphate, as determined by the same test, the "percent reduction in time of filtration" of the phosphate-treated sample is $$\frac{A-B}{A} \times 100$$

Example 1

Treatment with $Na_3PO_4$.—Asbestos, grade 5K was treated with $Na_3PO_4$ according to the procedure outlined and the products dried at 100° F. The following results were obtained.

| Amount of $Na_3PO_4$ added, percent of the weight of asbestos: | Percent reduction in time of filtration |
|---|---|
| 0.4 | 36.3 |
| 0.6 | 47.8 |
| 1.0 | 46.3 |
| 1.5 | 44.0 |
| 2.0 | 30.9 |

$Na_3PO_4$ solutions in water are distinctly alkaline. A 1.5% solution has a pH of about 12.4.

As can be seen from the above, maximum values were obtained within the range of 0.6 to 1.5% addition of $Na_3PO_4$.

Example 2

Treatment with $Na_2HPO_4$.—Asbestos, grade 5K, was treated with $Na_2HPO_4$ according to the procedure outlined and the products dried at 100° F. The following results were obtained.

| Amount of $Na_2HPO_4$ added, percent of the weight of asbestos: | Percent reduction in time of filtration |
|---|---|
| 0.2 | 26.6 |
| 0.4 | 40.4 |
| 0.6 | 49.1 |
| 1.0 | 67.0 |
| 1.5 | 66.7 |
| 2.0 | 63.0 |
| 2.5 | 52.6 |

$Na_2HPO_4$ solutions in water are slightly alkaline, but for practical purposes may be considered to be neutral. The pH of a 1.5% aqueous solution of $Na_2HPO_4$ N.F. grade was found to be 8.7.

Treatment of asbestos with $Na_2HPO_4$ produced an appreciable improvement in freeness, as shown by the above figures. Maximum improvement was obtained in the range of 1.0 to 1.5% addition.

Example 3

Treatment with $NaH_2PO_4$.—Asbestos, grade 5K, was treated with $NaH_2PO_4$ according to the procedure outlined and the products dried at 100° F. The following results were obtained.

| Amount of $NaH_2PO_4$ added, percent of the weight of asbestos: | Percent reduction in time of filtration |
|---|---|
| 0.2 | 29.8 |
| 0.4 | 48.4 |
| 0.6 | 50.0 |
| 1.0 | 71.7 |
| 1.5 | 77.9 |
| 2.0 | 86.3 |
| 2.5 | 85.7 |

$NaH_2PO_4$ solutions in water have an acid reaction. A 1.5% solution has a pH of approximately 4.5.

$NaH_2PO_4$ proved quite effective in improving freeness at an addition of 1.0 or 1.5%. Larger additions, up to the largest amount tested, namely 2.5%, proved even more effective.

Example 4

Effect of the temperature of drying.—The effect of drying at different temperatures was determined. In the following tests, asbestos 5K was used. 1.5% addition of the three ortho-phosphates shown was made and the products dried at the temperatures indicated.

| Temperature of drying, ° C. | Percent reduction in time of filtration | | |
|---|---|---|---|
| | $Na_3PO_4$ | $Na_2HPO_4$ | $NaH_2PO_4$ |
| 37.8 | 44.0 | 66.7 | 77.9 |
| 60 | 42.7 | 75.4 | 82.8 |
| 80 | | | 80.2 |
| 105 | 39.2 | 71.4 | 80.5 |

From the above results, it is concluded that essentially the same effect on freeness is produced by treatment of asbestos with these phosphates irrespective of the drying temperature when the products are dried within the range of 38 to 105° C.

Example 5 pH of products made with $NaH_2PO_4$.—Since $NaH_2PO_4$ is an acid salt, the acidity of products formed upon treatment of asbestos with $NaH_2PO_4$ was determined.

Ten-gram samples of asbestos 5K were treated with 0.6, 1.0, and 1.5% of $NaH_2PO_4$ and the products dried at 105° C. The products were placed in contact with moistened litmus paper; all produced a slight alkaline reaction. Each sample was then added to 100 ml. of distilled water and allowed to stand in contact for 14 hours. The pH of the slurry was then determined and, in each sample, was found to be 9.75. The pH of a control sample of the same asbestos (no phosphate added) was found to be 9.8. The phosphate-treated asbestos was thus found to be free from acid reaction and had practically the same pH as pure asbestos.

Example 6

Other grades of asbestos treated with $NaH_2PO_4$.—Three other grades of asbestos were treated with 1.5% addition of $NaH_2PO_4$ and dried at 100° F. The freeness was determined and the following results obtained.

| Grade of asbestos: | Percent reduction in time of filtration |
|---|---|
| 6D | 78.9 |
| 4T | 71.7 |
| 5D | 62.3 |

Example 7

A distinct improvement in filterability of asbestos grade 5D was obtanied in the following way.

Ten grams of asbestos 5D were treated with the addition of 1.5% of $NaH_2PO_4$ but, instead of dissolving the $NaH_2PO_4$ in 30 ml. of water, it was dissolved in 25 or 20 ml. of water. The products were dried thoroughly at 100° F. The following results were obtained.

| Amount of water used per 10 grams, asbestos, ml.: | Percent reduction in time of filtration |
|---|---|
| 25 | 73.0 |
| 20 | 84.5 |

As shown above, improved results were obtained when the phosphate was dissolved in the minimum amount of water necessary to moisten the asbestos or even in somewhat less water than this.

Example 8

Tests with polyphosphonates.—Some tests were carried out according to the standard procedure described hereinbefore to determine whether polyphosphates were effective in improping the freeness of asbestos. The results obtained were as follows. Asbestos 5K was used. Temperature of drying: 100° F.

| Amount of phosphate added [1] | Percent reduction in time of filtration | |
|---|---|---|
| | Sodium hexametaphosphate | Tetrasodium pyrophosphate |
| 0.75 | 67.3 | 44.7 |
| 1.0 | 69.4 | 50.6 |
| 1.5 | 72.8 | 64.1 |

[1] Percent of the weight of asbestos (on anhydrous basis).

A further series of tests was now carried out as follows. Asbestos 5K was treated with the polyphosphate according to the standard procedure described hereinbefore and the products dried at 105° C. Freeness of the products was determined. The following results were obtained.

| Amount of phosphate added [1] | Percent reduction in time of filtration | | |
|---|---|---|---|
| | Sodium hexametaphosphate | Tetrasodium pyrophosphate | Sodium tripolyphosphate |
| 0.2 | 31.3 | 26.8 | 16.8 |
| 0.6 | 65.0 | 37.8 | 40.8 |
| 1.5 | 69.0 | 61.5 | 44.1 |

[1] Percent of the weight of asbestos (on anhydrous basis).

The three phosphates used in the above tests are typical examples of three types of polyphosphates. While each of them produced improvement in the freeness of the asbestos, one of them, namely sodium hexametaphosphate, was distinctly superior to the other two.

Example 9

Tests with aluminum phosphate.—Neutral aluminum phosphate is insoluble in water but, at low pH, aluminum phosphates may be obtained in the form of concentrated, tacky, water solution, possibly colloidal in nature.

Solutions of aluminum phosphate may be prepared by dissolving aluminum hydroxide in phosphoric acid. (See Jameson and Salmon, Jour. Chem. Soc.: p. 4013, 1954.) The method of preparation is described in several patents, for example in U.S. Pats. 2,690,377, 2,538,867, 2,460,344.

Such solutions are available commercially. The composition of one of these sold by Monsanto Chemical Company under the trademark "Alkophos C" is given as follows:

Alkophos C:
  $P_2O_5$: 33.1%
  $Al_2O_3$: 8.6%
  Sp. gravity 25/15.5° C.: 1.47
  Free acidity (as $H_3PO_4$): 6.8
  pH, 1% solution: 2.6

Alkophos C could be diluted with water without precipitation and such a solution was used to treat asbestos.

Ten-gram portions of 5K asbestos were treated with 30 ml. of water containing a calculated amount of Alkophos C. The treated asbestos was dried at 105° C. and the freeness determined. The following results were obtained.

| Weight of Alkophos C added per 100 grams asbestos grams: | Percent reduction in time of filtration |
|---|---|
| 0.54 | 37.4 |
| 1.08 | 52.0 |
| 1.80 | 60.4 |
| 2.70 | 71.0 |

An addition of 2.7% of Alkophos C is equivalent in $P_2O_5$ content to the addition of 1.5% of $NaH_2PO_4$.

The results show that improved freeness can be obtained by the use of such aluminum phosphate solutions.

Example 10

Preparation and testing of a 1000-gram sample of asbestos.—A 1000-gram sample of asbestos 5D was treated with 1.5% of $NaH_2PO_4$ in the following manner:

1000 grams of the asbestos were treated with 2500 ml. of water containing 15 grams of $NaH_2PO_4$ and the product kneaded and put into pans. There was no perceptible free water. The product was dried thoroughly (to constant weight) at approximately 90° C. The product gave a slight alkaline reaction when touched with red litmus paper. The pH of a slurry of 10 grams in 100 ml. of water was found to be 9.8. The freeness was determined and the reduction in time of filtration compared to a control was 80.2%.

Example 11

Larger scale tests—A.C. slurry-rod mill tests: using monobasic sodium phosphate ($NaH_2PO_4$).—Eight 50 lb. lots of 4D grade asbestos fibers were treated as follows:

The fibers were fed to an air conveying system. Seven different aqueous solutions of calculated strength were prepared from distilled water and monobasic sodium phosphate crystals $NaH_2PO_4 \cdot H_2O$ and sprayed by use of a spraying nozzle on seven of the above mentioned eight lots, air-suspended in the system. The axis of the spray pattern was made to coincide with the axis of the flow of the air-suspended fibers. The fiber feed rate and the spraying rate were maintained constant. The fibers thus treated were passed through a radial type fan to a vertical cyclone collector and discharged. The air discharge of the cyclone collector was passed to the mill plenum (central dust collection unit), thence to the atmosphere. The duct leading from the radial fan to the cyclone collector had a twelve-inch diameter and the air velocity therein was approximately 4000 feet per minute. The sprayed fibers were collected and air dried to a moisture content of approximately one percent. The treatment deposited on the fibers an amount of $NaH_2PO_4$ as shown in Table 1.

The remaining lot was retained as control.

Freeness.—Ten-gram samples from each one of the above eight lots were collected and their freeness was determined as follows:

"Prepared water" was made as described hereinbefore. Each one of the above mentioned 10 gram-samples were, in turn, added to 500 ml. of "prepared water" and the mixture beaten for 60 seconds in a 1 liter beating apparatus equipped with a propeller-type laboratory stirrer rotated at high speed. Immediately after beating, the mixture was poured into a freeness tester and the freeness determined by the procedure "Freeness Test for Asbestos" described in "Testing Procedures for Chrysotile Asbestos Fiber," 1966 Edition, proposed by and prepared jointly by the Asbestos Textile Institute, the Mineral Fiber Products Bureau and the Quebec Asbestos Mining Association. The results were as shown in Table 1.

Asbestos-cement (A.C.) filtration time.—Separately, 20 gram-samples from each one of the above-mentioned eight lots were collected, placed in a 4 liter beaker and wetted with 200 ml. of "prepared water." The large lumps were broken down with a glass rod and 160 grams of portland cement and 800 ml. of "prepared water" were added. The resulting mixture was stirred at 1500 r.p.m. for six minutes with a laboratory stirrer to form a slurry, transferred to a 1 liter graduate and inverted twenty times. The asbestos-cement slurry was then transferred to an A.C. slurry filtration apparatus consisting of a vacuum based slurry box (75 mm. wide by 205 mm. long by 75 mm. high); and a vacuum of 200 mm. of mercury was applied and maintained on the base of the slurry box until the surface of the slurry lost its sheen. The interval of time between applying the vacuum and the last of the slurry's sheen was recorded to the nearest second as the time of filtration of the A.C. slurry.

The strength units were also determined on each one of these lots by the "Asbestos Fiber Strength Unit Test" procedures, as described in the manual "Testing Procedures for Chrysotile Asbestos Fibre" referred to hereinbefore.

The results were as shown in Table 1.

The eighteen rods were placed on top of the asbestos. The rod mill was then rotated at a speed of 36 r.p.m. Two samples from each lot were taken after 20 minutes and 40 minutes, respectively, of rod mill treatment. Freeness was determined for each lot from one of the samples taken after 20 minutes and 40 minutes respectively, of rod milling. The other samples taken from each lot after 20 minutes and 40 minutes of rod milling were retained and used to determine the filtration time of an A.C. slurry formed therefrom as described hereinafter. Table II shows the results of the freeness on the samples after 20 minutes and 40 minutes, respectively, of treatment in the rod mill.

TABLE II.—FREENESS (SEC.)

| Asbestos grade | Stirred, 6 min. | Rod milled, 20 min. | Rod milled, 40 min |
|---|---|---|---|
| 4D untreated | 272.0 | 660.0 | 992.0 |
| 4D treated with 0.497% $NaH_2PO_4$ | 190.0 | 473.0 | 732.0 |
| Percent improvement | 30.1 | 28.3 | 26.2 |

NOTE.—FIG. 1 is a graph showing the results obtained above.

A.C. slurry filtration time of rod milled asbestos.—The samples from each one of the two lots which were previously retained as described hereinbefore were treated as shown under Asbestos-Cement (A.C.) Filtration Time above to determine their asbestos-cement slurry freeness.

TABLE I

| Asbestos grade | Percent $NaH_2PO_4$ added | Filtration time, sec. | Percent reduction in Filtration time | Filtration time A.C. slurry, sec. | Percent reduction in A.C. slurry filtration time | Strength,[1] units |
|---|---|---|---|---|---|---|
| 4D | 0.0 | 64.5 | | 125.8 | | 110.2 |
| 4D | 0.169 | 28.0 | 56.6 | 119.5 | 5.0 | 108.6 |
| 4D | 0.327 | 25.0 | 61.2 | 117.0 | 7.0 | 110.8 |
| 4D | 0.497 | 21.5 | 66.6 | 111.0 | 11.8 | 107.8 |
| 4D | 0.659 | 16.5 | 74.4 | 103.5 | 17.7 | 110.9 |
| 4D | 0.843 | 16.0 | 75.2 | 104.6 | 16.9 | 107.2 |
| 4D | 0.929 | 15.5 | 76.0 | 101.0 | 19.7 | 108.1 |
| 4D | 1.395 | 8.0 | 87.6 | 85.5 | 32.0 | 106.6 |

[1] Taking into consideration the limits of the testing method, these results indicate that the strength of asbestos fibre in asbestos-cement mixtures is not materially affected by treatment with monobasic sodium phosphate, in the conditions shown in Example 11.

Rod mil tests.—In order to duplicate practical operating conditions wherein, in most applications, the bundles of asbestos fibers are broken up, two of the lots of asbestos fibers, one being the control and the second one being the lot having deposited on the fibers 0.49% $NaH_2PO_4$, were subjected to treatment in a rod mill and freeness of the fibers and time of filtration of A.C. slurries formed from said fibers were determined as follows:

From the balance of each one of the two lots of asbestos, treated as described above, 26 lb. lots were collected, moistened with 3 kg. of water and hand-mixed for one minute. Samples were then collected (two samples for each lot). The first sample of each lot (10 g. each, dry basis) was subjected to a stirring treatment for six minutes in a 1 liter beating apparatus, equipped with a paddle 40 mm. wide, 100 mm. high, rotating at 1500 r.p.m., following which the freeness thereof was determined. The results were as shown in Table II. The second sample of the two lots (20 g. each, dry basis) was retained to determine the time of filtration of an A.C. slurry formed therewith as described hereinafter.

The balance of each lot of moistened asbestos was charged into a rod mill which had the following dimensions:

Dimensions of the mill:
  Diameter: 500 mm.
  Length: 750 mm.
Dimensions of the Rods:
  Diameter: 60 mm.
  Length: 725 mm.
  Number of Rods: 18

The time of filtration was measured as described. The results were as shown in Table III.

TABLE III.—A.C. SLURRY FILTRATION TIME (SEC.)

| | Slurry stirred, 6 min. | | |
|---|---|---|---|
| Asbestos grade | No. rod milling | Fiber rod milled 20 min. | Fiber rod milled 40 min. |
| 4D untreated | 138.0 | 183.0 | 221.5 |
| 4D treated with 0.497% $NaH_2PO_4$ | 133.0 | 144.0 | 168.2 |
| Percent improvement | 3.6 | 21.3 | 24.2 |

NOTE.—FIG. 2 is a graph showing the results obtained above.

Example 12

Treatment of asbestos fibers with phosphoric acid.— Five 50 lb. lots of 5D grade asbestos fibers were treated as follows:

Four different aqueous solutions of calculated strength were prepared from distilled water and 85% certified A.C.S. Ortho Phosphoric Acid. The fibers were fed to an air conveying system and sprayed with these solutions in the same manner as described in Example 11. The treatment deposited on the fibers an amount of $H_3PO_4$ as shown in Table IV.

The remaining lot was retained as control.

Freeness.—Ten-gram samples from each one of the above eight lots were collected and their freeness was determined in the same manner as described in Example 11. The results were as shown in Table IV.

Asbestos-cement (A.C.) filtration time.—Separately, 20-gram samples from each one of the above-mentioned eight lots were processed as described in Example 11 to determine the time of filtration of an A.C. slurry formed therewith. The results were as shown in Table IV.

TABLE IV

| Asbestos grade | Percent $H_3PO_4$ added | Filtration time, sec. | Percent reduction in filtration time | Filtration time A.C. slurry, sec. | Percent reduction in A.C. slurry filtration time | Strength,[1] units |
|---|---|---|---|---|---|---|
| 5D | 0.0 | 90.0 | | 134.0 | | 105.6 |
| 5D | 0.195 | 26.5 | 70.6 | 118.0 | 11.9 | 102.7 |
| 5D | 0.409 | 18.0 | 80.0 | 112.8 | 15.9 | 104.5 |
| 5D | 0.601 | 14.0 | 84.5 | 107.2 | 20.0 | 102.5 |
| 5D | 0.751 | 12.5 | 86.2 | 100.2 | 25.2 | 102.6 |

[1] Notes:
(1) Taking into consideration the limits of the testing method, these results indicate that the strength of asbestos fibre in asbestos-cement mixtures is not materially affected by treatment with phosphoric acid, in the conditions shown in Example 12.
(2) Strength units determined by the "Asbestos Fibre Strength |Unit Test" procedure, as described in the manual "Testing Procedures for Chrysotile Asbestos Fibre."

Rod mill tests.—Two of the lots of asbestos fibers, treated as described hereinbefore, one being the control and the second one being the lot having deposited thereon 0.195% $H_3PO_4$, were subjected to treatment in a rod mill and freeness of the fibers and time of filtration of A.C. slurries formed from said fibers were determined as follows:

From the balance of each one of the two lots of asbestos, 26 lb. lots were collected, moistened with 3 kg. of water and hand-mixed for one minute. Samples were then collected and tests made as shown in Example 11 in a rod mill as described therein. The results are shown in Table V:

TABLE V.—FREENESS (SEC.)

| Asbestos grade | Stirred, 6 min. | Rod milled, 20 min. | Rod milled, 40 min. |
|---|---|---|---|
| 5D untreated | 288.0 | 637.0 | 1260.0 |
| 5D treated with 0.195% $H_3PO_4$ | 276.0 | 430.0 | 840.0 |
| Percent improvement | 4.2 | 32.5 | 33.3 |

Note.—FIG. 3 is a graph showing the above results.

A.C. slurry filtration time of rod milled asbestos.—The rod milled samples of $H_3PO_4$-treated asbestos retained as described in Example 11 were treated as shown under Asbestos-Cement (A.C.) Filtration Time in Example 11 to determine their asbestos-cement slurry freeness. The time of filtration was measured as described. The results were as shown in Table VI:

TABLE VI.—A.C. SLURRY FILTRATION (SEC.)

| | Slurry stirred, 6 min. | | |
|---|---|---|---|
| Asbestos grade | No. rod milling | Fiber rod milled, 20 min. | Fiber rod milled, 40 min. |
| 5D untreated | 150.5 | 202.0 | 247.0 |
| 5D treated with 0.195% $H_3PO_4$ | 145.3 | 181.0 | 205.3 |
| Percent improvement | 3.5 | 10.4 | 16.9 |

Notes:
(1) FIG. 4 is a graph showing the above results.
(2) The samples tested were, as described, collected from 26 lb. lots which were previously wetted with water. The incorporation of this excess water (approximately 4 cc) may account for the difference between the filtration time of the stirred samples above and the filtration time of the A.C. Slurry in Table I.

I claim:

1. Asbestos fibers having increased freeness consisting essentially of asbestos substantially in loose condition containing a metal or ammonium phosphate or polyphosphate or a corresponding acid dried on the fibers, the phosphate material being bonded on the fibers in an amount of about 0.2 to 5% by weight based on the dry fibers.

2. A produce according to claim 1 wherein said phosphate or polyphosphate is an ammonium phosphate or polyphosphate.

3. A product according to claim 1, wherein said amount is from about 0.4% to about 2.0% by weight.

4. A product according to claim 1 wherein said phosphate is monobasic sodium phosphate.

5. A product according to claim 1 wherein said phosphate or polyphosphate is a phosphate or polyphosphate of an alkali metal.

6. A product according to claim 5 wherein said alkali metal is sodium or potassium.

7. Asbestos fibers having increased freeness consisting essentially of asbestos substantially in loose condition containing a metal or ammonium phosphate or polyphosphate or a corresponding acid dried on the fibers, the phosphate material being bonded on the fibers in an amount of not over 5% by weight based on the dried fibers and in an amount not less than that which will give a minimum decrease in time of filtration of at least 16.8% as determined by the equation $$\frac{A-B}{A} \times 100$$

where A is the time of filtration in seconds of a control sample of asbestos and B is the time of filtration in seconds of the asbestos sample treated with phosphate material said time being determined by the Freeness Test for Asbestos.

References Cited

UNITED STATES PATENTS

| 2,124,768 | 7/1938 | Drill et al. | 117—140 X |
| 2,567,559 | 9/1951 | Greider et al. | 117—126 |
| 3,232,865 | 2/1966 | Quinn et al. | 117—126 X |
| 3,383,230 | 5/1968 | Streib et al. | 162—153 X |

WILLIAM D. MARTIN, Primary Examiner

D. COHEN, Assistant Examiner

U.S. Cl. X.R.

117—126, 169; 162—153